United States Patent [19]

Kadlec et al.

[11] Patent Number: 5,499,353

[45] Date of Patent: Mar. 12, 1996

[54] CACHE ADDRESS STROBE CONTROL LOGIC FOR STIMULATED BUS CYCLE INITIATION

[75] Inventors: Ken A. Kadlec; Wendy P. Kadlec, both of Irvine, Calif.

[73] Assignee: AST Research, Inc., Irvine, Calif.

[21] Appl. No.: 492,870

[22] Filed: Jun. 20, 1995

Related U.S. Application Data

[63] Continuation of Ser. No. 39,891, Mar. 30, 1993, abandoned.

[51] Int. Cl.[6] .................................................... G06F 12/02
[52] U.S. Cl. ........................ 395/445; 395/403; 395/464; 395/494; 395/500; 364/DIG. 1; 364/239.1; 364/238.4; 364/242.3; 364/243.41; 364/251.4; 364/261.8
[58] Field of Search .................................. 395/403, 405, 395/431, 440, 444, 445, 464, 494, 550, 500, 452, 453

[56] References Cited

U.S. PATENT DOCUMENTS

| 4,912,632 | 3/1990 | Gach et al. ............................. 395/425 |
| 5,305,277 | 4/1994 | Derwin et al. ..................... 365/230.02 |
| 5,339,399 | 8/1994 | Lee et al. ................................ 395/425 |
| 5,450,565 | 9/1995 | Nadir et al. ............................. 395/427 |

FOREIGN PATENT DOCUMENTS 2231422   11/1990   United Kingdom.

OTHER PUBLICATIONS

Klanseck, R. M., "Interface speeds bus data swaps," EDN Electrical Design News, vol. 27, No. 5, pp. 160 and 163, Mar. 1992.

Legenhausen, J., et al., "Second-Level Cache for the 80486 Using a PLD-Based Cache Controller," Wescon Conference Record, vol. 36, pp. 76–83, Nov. 1992.

Primary Examiner—Eddie P. Chan
Assistant Examiner—Hiep T. Nguyen
Attorney, Agent, or Firm—Knobbe, Martens, Olson & Bear

[57] ABSTRACT

A cache control system generates an alternate cache control signal to unload a CPU driven bus control signal without interfering with the bus control of the other processors in the system. The alternate cache control signal removes most of the loading from the control signals of the CPU. One feature of the cache control system enables an increase in the external cache capacity of the computer system by increasing the number of synchronous SRAM chips which can be controlled by the system. Another feature enables an increase in the system performance time for memory accesses from the external cache by decreasing delays in the receipt of cache control signals.

7 Claims, 7 Drawing Sheets

FIG. 6  DMA READ HIT

CACHE ADDRESS STROBE CONTROL LOGIC FOR STIMULATED BUS CYCLE INITIATION

This application is a continuation of U.S. patent application Ser. No. 08/039,891, filed Mar. 30, 1993, now abandoned.

BACKGROUND OF THE INVENTION

1. Field of the Invention

The present invention relates to an improved cache control system to reduce the amount of loading of the CPU driven control signals.

2. Description of the Related Art

In the electronics industry, there is an ever increasing demand for increased performance from computer systems. This need also includes a need for increased system memory capacities. More specifically, there exists a constant need for adding additional cache storage capacity to decrease the system's performance time for memory accesses. Currently, computer system designers are looking toward 50 MHz systems coupled with up to 512 Kb of external cache storage area.

The cache storage area responds directly to memory requests from a central processing unit (CPU) as well as from other subsystems, such as direct memory access (DMA) controllers, memory controllers, other cache controllers, I/O controllers and peripheral controllers. The CPU uses an address status output (ADS*) signal as an indicator to the other controllers in the system and to the cache storage area that the CPU is starting a bus cycle. (As used herein, an asterisk at the end of a signal name or mnemonic indicates a signal that is active at a low logic level.) The ADS* signal indicates that the address and bus definition signals from the CPU are valid and have been presented to the system bus. The cache control and bus control circuitry must sample the bus cycle definition signals from the CPU on the next rising edge of the clock after the ADS* signal is driven active. In the desired 50 MHz system, the signals must be sampled within 20 ns, one clock period, from the receipt of the ADS* signal. In addition, the ADS, signal must be received to latch the valid address signals into each of the synchronous static random access memory chips, or synchronous SRAM chips, which make up the cache storage area before the required set up time of the synchronous SRAM. The set up time is the amount of time that the ADS* signal must be present at the input of the synchronous SRAM before the receipt of the next clock cycle which will clock the address signals into the synchronous SRAM. The set-up time for a typical synchronous SRAM is between 2–3 ns.

With the increased demands for larger banks of external cache, such as 256 Kb and 512 Kb banks of cache, the number of synchronous SRAM chips required to provide the larger banks of external cache is increasing, because the capacity of the individual synchronous SRAM chips has stayed the same. Using 32 Kb×9 bit synchronous SRAMs for the cache, a 256 Kb cache will require eight synchronous SRAM chips. Each of the synchronous SRAM chips must be individually driven by the ADS* signal to enable each chip to sense when the CPU is beginning a bus cycle. The connection of the ADS* signal to the bus control logic as well as to the eight synchronous SRAM chips causes the ADS* signal to become excessively loaded. This excessive loading of the ADS* signal can cause delays in the receipt of the ADS* signal by the synchronous SRAM chips, particularly those SRAM chips which are located farthest away from the CPU and are thus subject to the longest propagation delays in receipt of the ADS* signal. Current CPU's such as the INTEL 486DX provide an ADS* signal which is a 12 ns signal when the signal is unloaded. By loading down the ADS* signal with eight synchronous SRAMs along with its other control responsibilities in the system, the delay in the receipt of the ADS* signal can be increased from 12 ns when the ADS* signal is unloaded to up to 18 ns when the signal is loaded by the cache and the other control circuits. Typically, a 4–6 ns delay in the receipt of the ADS* signal by the individual chips is expected depending on the location of the chips and the number of chips which are tied to the ADS* signal. This 4–6 ns delay in the receipt of the ADS* signal may be unacceptable for some synchronous SRAMs. For example, if the CPU is running on a 20 ns clock, i.e., a 50 MHz system, and the delay in the receipt of the ADS* signal is increased from 12 ns to 18 ns, the ADS* signal would arrive 2 ns before the next clock signal and would not meet the required minimum 3 ns set up time of most synchronous SRAMs.

Further, the ADS* signal is connected to other logic circuits which have longer required set up times, up to 5 ns in some cases. By over loading the ADS* signal with all of the synchronous SRAMs, the ADS* signal will not meet the set up times required by the most of the system control logic that the ADS* signal is connected to and the system will not be able to function properly.

As disclosed in the prior art, to prevent the excessive loading of the ADS* signal, the ADS* signal can be buffered. However, buffering the ADS* signal results in an inherent increased delay in the receipt of the signal caused by propagation delay within the buffer circuits. The fastest buffers available would still result in a 4–5 ns delay in the receipt of the ADS* signal. This 4–5 ns delay caused by buffering is essentially the same scale of delay that is caused by the excessive loading of the ADS* signal. For example, if the CPU is running on a 20 ns clock, i.e., a 50 MHz system, and the delay in the receipt of the ADS* signal is increased due to the buffering from 12 ns to 17 ns, the ADS* signal would arrive at best 3 ns before the next clock signal and may not always meet the required minimum 3 ns set up time of most synchronous SRAMs. Further, the 3 ns arrival of the ADS* signal before the next clock signal would not be acceptable for the other logic circuits which require set up times in the order of 5 ns.

Therefore there exists a need in the prior art to enable the unloading of the bus control signals which are driven by the CPU in order to improve the system performance times for memory accesses while still enabling an increase in the system memory capacity.

SUMMARY OF THE INVENTION

The present invention comprises a cache control system which generates an alternate cache control signal that is not affected by the loading of the additional synchronous SRAMs required by a large cache, and which reduces the loading on the CPU driven bus control signals without interfering with the bus control of the other processors in the system. The cache control system of the present invention has many improved features over prior art cache control systems. One feature enables an increase in the external cache capacity of the computer system. Another feature enables an increase in the system performance time for memory accesses from the external cache.

A preferred embodiment of the improved cache control logic system comprises an alternate cache control signal which is set at an active level to enable the cache storage area to store address signals which have been placed on the system bus and at an inactive level to enable the cache storage area to respond to a valid address signal which was stored during the previous clock cycle. The cache control system comprises logic which determines that the central processor is ready to begin a bus cycle and sets the alternate cache control signal to an inactive level at the beginning of the CPU controlled logic cycle. In addition, the cache control system comprises logic which determines that the memory controller is ready to begin a bus cycle and sets the alternate cache control signal to an inactive level and then to an active level for one clock cycle at the beginning of the bus cycle when the memory controller presents valid address signals to the system bus. Further, the cache control system comprises logic which determines the end of the bus cycle and sets the alternate cache control signal to an active level to enable the cache storage area to store address signals which have been placed on the system bus.

A preferred embodiment of the cache control logic of the present invention comprises a series of logic states which control an alternate control logic signal. The logic begins with a first idle state in which an alternate control logic signal is maintained at an active level to enable address signals from the central processor to be sampled into the cache storage area. A CPU BUSY state occurs when the cache control logic is in the idle state and an active address status output signal is received, wherein the alternate control logic signal is maintained at an inactive level until the end of a bus cycle is detected and the cache control logic returns to the idle state. A DMA state occurs when the cache control logic is in the idle state and a DMA controller receives control of the system bus, wherein the alternate control logic signal is set at an inactive state and wherein the cache control logic will return to the idle state if the DMA controller relinquishes control of the system bus. A DMA WAIT state occurs when the cache control logic is in the DMA state and the DMA controller sets a DMA address status output signal to an active level, wherein the alternate cache control logic signal is set to an active level for one clock cycle. A DMA BUSY state occurs one clock cycle after a DMA wait state, wherein the alternate cache control logic signal is reset to an inactive level. While in the DMA BUSY state and upon detection of the end of a bus cycle, the cache control logic will return to the DMA state.

Another aspect of the present invention comprises a method of improving the cache access in a computer system. An alternate cache control signal is maintained at an active level to enable the storage of a series of address signals into the cache storage area. The cache control logic determines when the central processor is ready to begin a bus cycle on the system bus and when the memory controller is ready to begin a bus cycle on the system bus. An alternate cache control signal is issued at an inactive level to halt the storage of address signals from the system bus into the cache storage area, as the previously stored address is a valid address signal. The cache control logic determines when the bus cycle is complete, and resets the alternate cache control signal to an active level to enable the cache storage area to store address signals from the system bus.

DETAILED DESCRIPTION OF THE PREFERRED EMBODIMENT

Figure 1:
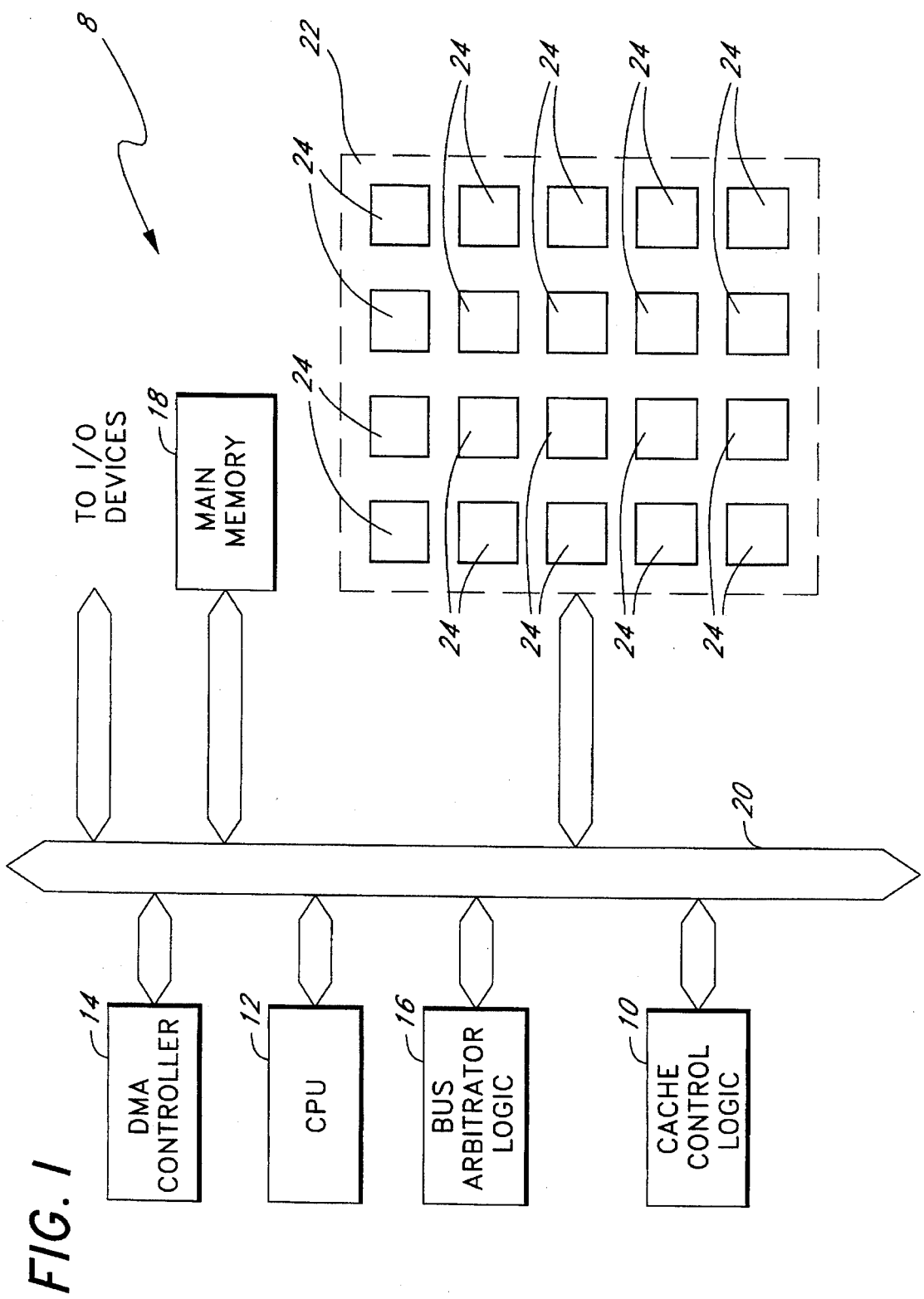
FIG. 1 is a block diagram of a computer system which utilizes the alternate cache control logic of the present invention.

The present invention comprises a cache control system which generates an alternate cache control signal to unload the CPU driven address control signal without interfering with the bus control of other processors in a computer system. The alternate cache control system of the present invention has many improved features over prior art cache control systems. As illustrated in the block diagram of FIG. 1, a typical computer system 8 which utilizes the improved cache control system of the present invention comprises cache control logic 10, a central processing unit (CPU) 12, a direct memory access (DMA) controller 14, bus arbitrating circuitry 16, a main memory 18, a common bus 20 and a cache storage area 22, or a cache bank, which comprises of a plurality of synchronous static random access memory chips, or synchronous SRAMs, 24. The cache control logic 10 can be formed from a variety of circuits such as discrete logic gates, a Programmable Array Logic (PAL), Application Specific Integrated Circuit (ASIC), or the like. Preferably, the cache storage area 22 comprises 32K×9 bit burst synchronous SRAMs 24 which are equipped with the capacity to transfer a block of data comprising several data words at a time.

Figure 2:
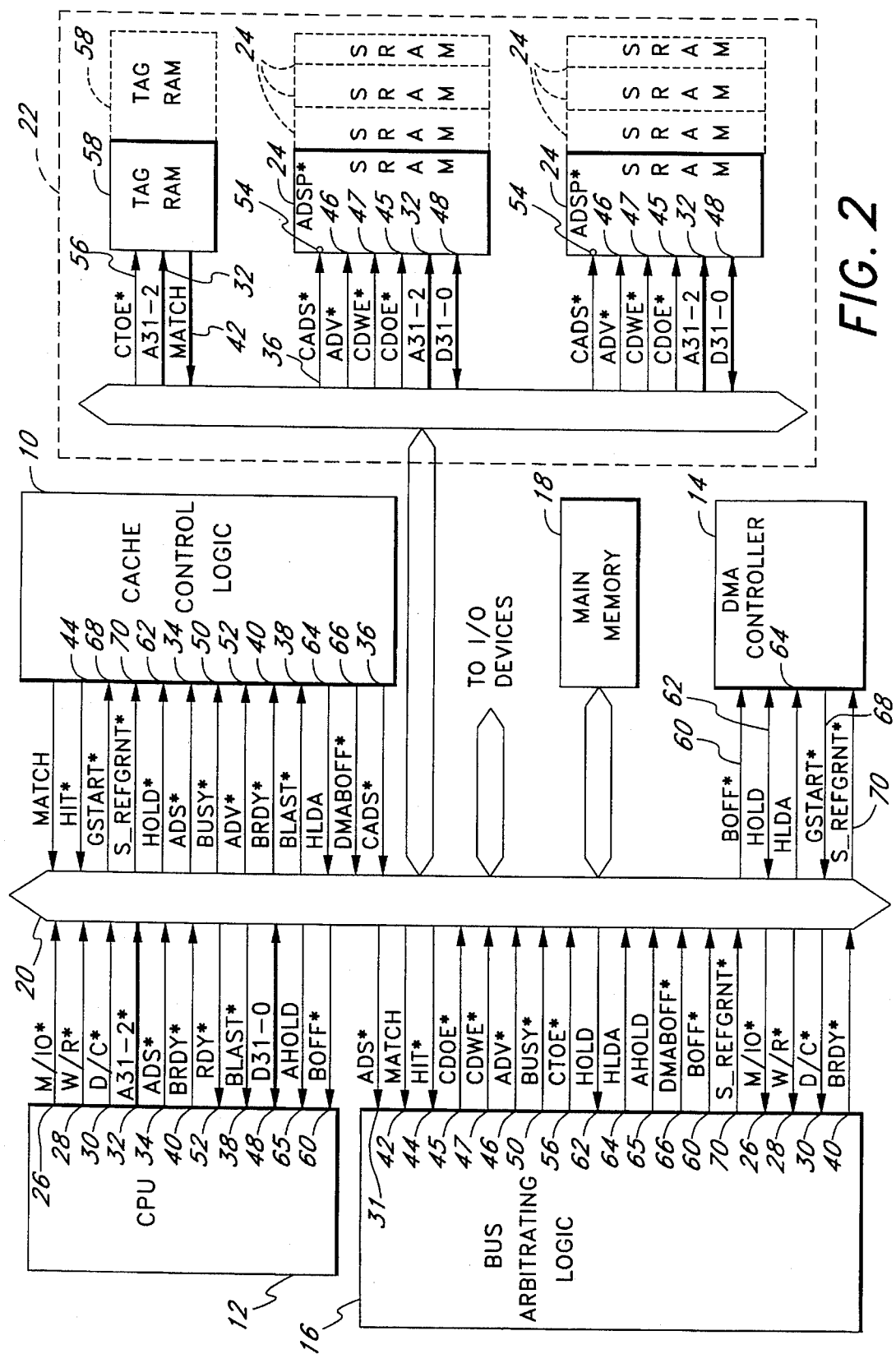
FIG. 2 is a schematic diagram of the alternate cache control logic of the present invention in communication with elements of the computer system illustrated in FIG. 1.

When the system bus 20 is under the control of the CPU 12, the CPU 12 must generate all of the required bus control signals and deliver them to the bus arbitrating logic 16 and cache control logic 10. At the beginning of a bus cycle, the CPU 12 must generate bus definition signals which indicate to the bus arbitrating logic 16 the nature of the bus request. As illustrated in FIG. 2, the bus definition signals preferably comprise a W/R* signal on the line 28, an M/IO* signal on the line 26 and a D/C* signal on the line 30. The W/R* signal on the line 28 indicates that the bus request is a read or a write cycle. When the W/R* signal is at a logic high level, the bus request is a write cycle. When the W/R* signal is at a logic low level, the bus request is a read cycle. The M/IO* signal on the line 28 indicates when the bus is requesting data from the system memory 18 or from an I/O device (not shown). When the M/IO* signal is at a logic high level, the bus is requesting data from the system memory 18. When the M/IO* signal is at a logic low level, the bus is requesting data from an I/O device. The D/C* signal on the line 30 indicates whether the information that is requested on the bus is a data structure or an operational code. When the D/C* signal is at a logic high level, the requested information is a data structure. When the D/C* signal is at a logic low level, the information that is requested is an operational code. In addition, if the CPU 12 has requested the bus 20, it must also provide address signals A31-2 on the lines 32 to the system bus 20 to indicate the location of the data to which the CPU 12 is requesting access.

When the CPU 12 is ready to begin a bus cycle, the CPU 12 initiates an Address Status Output (ADS*) signal on the line 34, which informs the bus arbitrating circuitry 16 and the cache control logic 10 that the bus definition signals which are being presented to the system bus 20 are valid on the lines 26, 28, 30 and the address signals A31-2 are valid on the lines 32. The ADS* signal is an active low signal, i.e., the ADS* signal indicates that the CPU 12 is ready to begin a bus cycle when the ADS* signal is at a low logic level. The ADS* signal on the line 34 is an input to the bus arbitrating circuitry. In a conventional memory system, the ADS* signal 34 would also be sent directly to all of the synchronous SRAM chips 24 of the cache storage area 22. However, to prevent the ADS* signal 34 from becoming loaded down by tying the signal to a large number of chips, the cache control logic 10 generates an alternate cache control signal (CADS*) on a line 36. The alternate cache control signal (CADS*) is provided as a substitute control signal for the ADS* signal. The CADS* signal on the line 36 is preferably delivered to each of the synchronous SRAM chips 24 in the cache storage area 22 in the place of the ADS* signal on the line 34. The ADS* signal on the line 34 is still delivered to the cache control logic 10, the bus arbitrating circuitry 16 and to other system control circuits, such as an address latch controller (not shown), and a parity checking circuit (not shown). By only requiring the ADS* signal on the line 34 to be delivered to a reduced number of chips, the loading of the ADS* signal on the line 34 is reduced to a nominal level. Further, as seen below, the CADS* signal is activated sufficiently in advance of the required set up time for the synchronous SRAMs to assure that they respond in a timely manner. Preferably, the CADS* signal is generated by cache control logic 10 which has greater output drive capabilities than the CPU 12 which will enable the cache control logic 10 to switch heavily loaded signals at a faster rate, thus responding to the changes in the signal before the required set up time of the logic.

Figure 3:
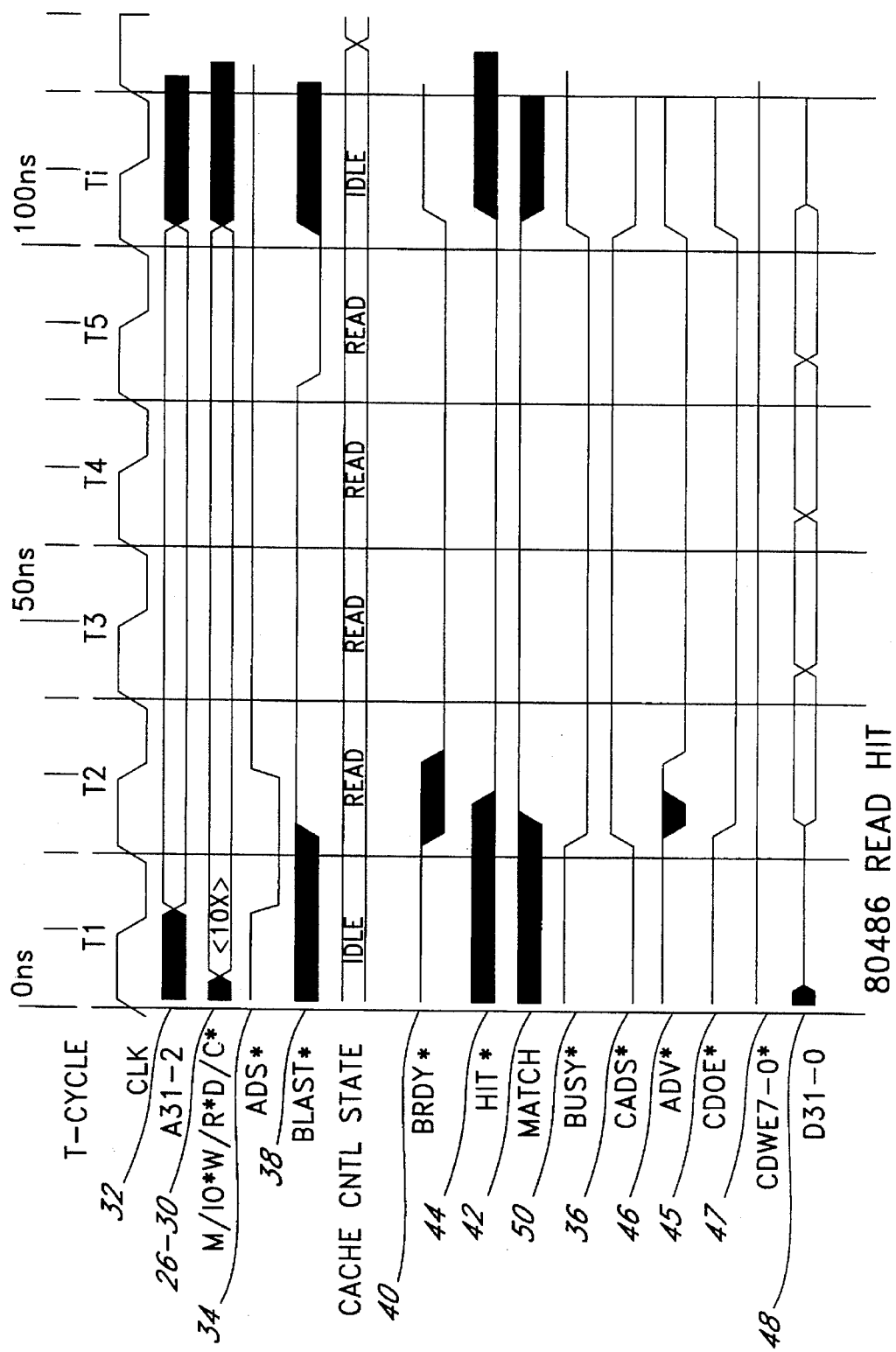
FIG. 3 is a timing diagram illustrating the timing of the bus control signals during a CPU read cache hit cycle for a system which utilizes the alternate cache control logic of the present invention.

FIG. 3 illustrates a typical CPU cache hit read cycle, (i.e., a cycle in which the address generated by the CPU matches an address for which data are stored in the cache memory storage area 22) The numbers on the timing diagram match the numbers on the lines generating the signal, as illustrated in FIG. 2. The CLK signal illustrates the progression of the read hit cycle. The bus definition signals which preferably include the W/R* signal on the line 26, the M/IO* signal on the line 28 and the D/C* signal on the line 30 are initiated to define the type of bus request in the first clock cycle. In the example of FIG. 3, the M/IO* signal on the line 26 is at a logic high level indicating that the data are being requested from the system memory 18. The W/R* signal on the line 28 is at a logic low level indicating that the cycle is a read cycle. The D/C* signal on the line 30 is indicated as a don't care signal, since the type of data to be retrieved does not affect the progression of the cycle. The address requested by the CPU 12 is presented to the system bus 20 via address signals A31-2 on the lines 32. The CPU 12 initiates the ADS* signal on the line 34 to an active level to indicate the beginning of a CPU driven bus cycle. The CPU will simultaneously present the address signals A31-2 on the lines 32 and the bus cycle definition signals 26–30 to the system bus 20 within the first clock cycle. The CPU addresses A31-2 on the lines 32 are controlled such that the CPU will not change the addresses A31-2 within the set up and hold times of the cache memory, so that the data stored in the cache storage area 22 are not corrupted. The CADS* signal on the line 36 is generated by the cache control logic 10 of the present invention such that once the CPU 12 begins a bus cycle, i.e., the ADS* signal on the line 34 is detected at an active level, the CADS* signal on the line 36 is set at an inactive level during the second clock cycle until the end of the bus cycle is detected. The CPU 12 indicates that it is beginning a burst cycle by driving a BLAST* signal on the line 38 inactive during the second clock cycle. The bus arbitrating logic 16 responds that the system bus 20 is ready to perform a burst cycle by driving a BRDY* signal on the line 40 active. If the address requested by the CPU 12 is available in the cache storage area 22, the MATCH signals on the lines 42 are set to an active level within the second clock cycle by the cache storage area 22 to indicate that the requested address A31-2 on the lines 32 is stored in the cache storage area 22. The MATCH signals on the lines 42 are delivered to the bus arbitrator circuitry 16. Upon the receipt of the MATCH signals on the line 42, the cache control logic 10 returns a HIT, signal on the line 44, also within the second clock cycle, to indicate that the requested data are located in the cache storage area 22. The CPU sets the CDOE* signals, or cache data output enable signals, on the line 45 to an active level, during the second clock cycle, to enable the synchronous SRAMs 24 to output their valid data. The CPU 12 sets an ADV* signal on the line 46, during the second clock cycle, to an active level to advance the address within the burst synchronous SRAMs 24 from the applied starting address A31-2 on the lines 32 to the subsequent addresses stored in the synchronous SRAM 24. The address in the synchronous SRAM 24 will advance to the subsequent address for each clock cycle that the ADV* signal on the line 46 is sampled active. In this case, the data from the initial address A31-2 on the lines 32 as well as the next three subsequent addresses are read into the CPU 12. The CDWE* signals, or cache data write enable signals, on the lines 47 remain at an inactive level for the entire cycle, since the cycle is a read cycle. After each read cycle, the valid data D31-0 from the requested address are sent to the central processor 12 on the lines 48 as indicated in the timing diagram. When the BLAST* signal on the line 38 is driven to an active level by the CPU 12, it indicates to the external circuitry that the receipt of the next BRDY* signal on the line 40 will indicate the end of the current cycle.

The end of the read cycle is determined by the cache control logic 10 of the present invention upon the receipt of a BUSY* signal on the line 50 and the receipt of the BRDY* signal on the line 40 for a cacheable cycle since all cache cycles are burst cycles. The BUSY* signal on the line 50 is provided by the bus arbitrating logic 16 to indicate that a bus cycle is in progress. The activation of the BUSY* signal on the line 50 prevents other processors from trying to take control of the system bus 20 while the bus 20 is currently in use by one of the processors. The BUSY* signal on the line 50 is initiated by the bus arbitrating logic 16 when the following conditions are true: the ADS* signal on the line 34 is detected at an active level, the system bus 20 is not aborting its current cycle, a current memory cycle is not placing valid data on the system bus 20 and the computer system 8 is not in the process of a cold start. The BUSY* signal on the line 50 remains active for each subsequent clock cycle assuming the following conditions are true: the BUSY* signal was active during the previous clock cycle, the end of the current cycle is not detected and a cold start has not occurred. For a cacheable burst read cycle, such as illustrated in FIG. 3, the end of the cycle, or EOC, is determined by the receipt of a BLAST* signal on the line 38 which indicates that the next time the BRDY* signal on the line 40 is received the burst cycle is complete. When the BRDY* signal on the line 40 is active along with the BLAST* signal on the line 38, the end of the burst cycle is detected by the cache control logic 10. Upon the detection of the end of the cycle along with the receipt of the BUSY* signal at an active level on the line 50, the alternate control signal (CADS*) on the line 36 is set to an active level, i.e., a low logic level, to enable the CPU 12 or other processor to initiate a new bus cycle.

Referring back to FIG. 2, the alternate control logic signal (CADS*) on the line 36 is connected to the same input of the synchronous SRAM chips 24 to which the ADS* signal on the line 34 would usually be connected. The CADS* signal on the line 36 is therefore connected to the Address Status Processor (ADSP*) input 54 on each of the burst synchronous SRAM chips 24. The ADSP* input 54 is an active low input. Thus, the synchronous SRAM chips 24 sample the address signals when the signal on the input 54 is at a low logic level. Since the ADS* signal on the line 24 is an active low signal and the ADSP* input 54 is an active low input pin, the synchronous SRAM chips normally sample the address signals during the single clock cycle when the ADS* signal on the line 34 is active indicating that the address signals are valid. However, in the present invention, the CADS* signal is an active low signal which is maintained in its active state until a bus cycle begins following an active ADS* signal. When the active CADS* signal on the line 36 is applied to the ADSP* input 54 of the burst synchronous SRAM chips 24, the synchronous SRAM chips 24 will sample the address signals A31-2 on the lines 32 at every clock cycle when the address signals are not valid even though the ADS* signal on the line 34 is at an inactive level, i.e., when the CPU 12 is not initiating a bus cycle. However, the synchronous SRAM chips 24 are not provided with the required signals, such as the CDOE* signals on the lines 45 to output the data D31-0 to the system bus 20 until the address signals are valid. Thus, the CDOE* signal is not active until the ADS* signal is active. Once the CPU 12 initiates a bus cycle, the ADS* signal on the line 34 is at a logic low level indicating that the data on the bus definition signals on the lines 26–30 and address signals on the lines 32 are valid. The valid address signals A31-2 will be sampled into the synchronous SRAM chips 24 once the ADS* signal is active and will replace the address sampled in on the last cycle. The CADS* signal on the line 36 will then be set to an inactive logic high level and will prevent the synchronous SRAM chips 24 from sampling in a new address while the bus cycle is progressing. Once the bus cycle begins, it is important that the initial address A31-2 on the lines 32 is prevented from being continuously sampled into the synchronous SRAM 24 to enable the ADV* signal on the line 46 to increment the initial address, rather than forcing the synchronous SRAMS to continue to sample the initial address. When the CDOE* signals on the lines 45 are delivered to the synchronous SRAM chips 24, the requested data are output onto the system bus 20 and are delivered to the requesting processor, i.e., the CPU 12. As described above, the CADS* signal on the line 36 remains at an inactive high logic level for the entire bus cycle to prevent unwanted addresses from being sampled into the synchronous SRAM chips 24. Once the bus cycle is complete, the CADS* signal on the line 36 is reset to its active state to enable the continuous sampling of the address signals into the synchronous SRAMS 24 to continue until the signals which are presented are valid and a new bus cycle is initiated. By continuous sampling of the address lines in response to the CADS* signal, the synchronous SRAMs do not have to wait for the potentially heavily loaded and slow bus control signal, i.e., the ADS* signal, to become active before responding to the current address.

Figure 4:
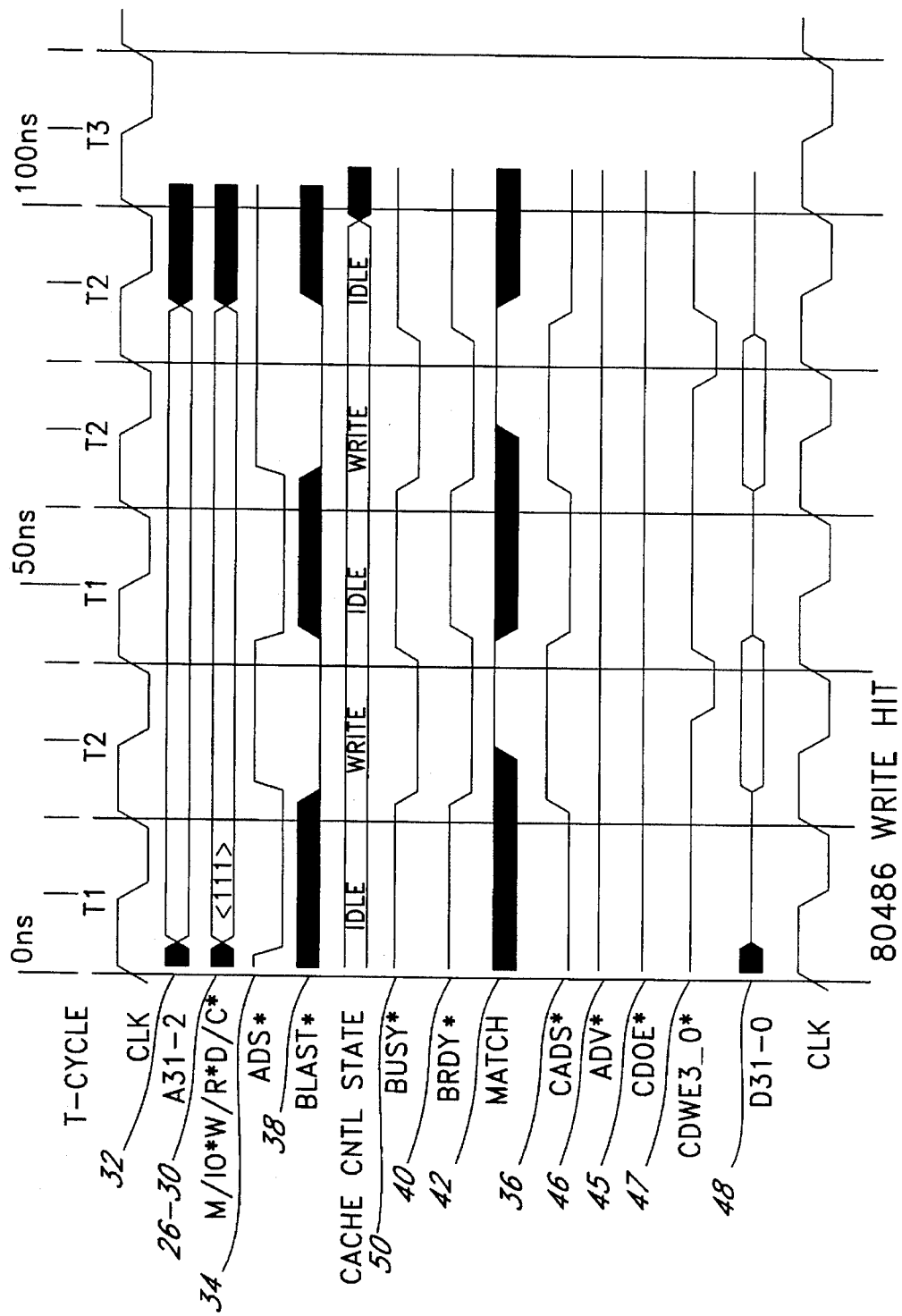
FIG. 4 is a timing diagram illustrating the timing of the bus control signals during a CPU write cache hit cycle for a system which utilizes the alternate cache control logic of the present invention.

FIG. 4 illustrates a typical CPU write hit cycle. The CLK signal illustrates the progression of the clock signal through the read hit cycle. The bus definition signals which preferably include the W/R* signal on the line 26, the M/IO* signal on the line 28 and the D/C* signal on the line 30 are initiated first to define the type of bus request. In the example of FIG. 4, the M/IO* signal on the line 28 is at a logic high level to indicate that the data are being requested from the system memory 18. The W/R* signal on the line 26 is at a logic high level indicating that the cycle is a write cycle. The D/C* signal on the line 30 is indicated at a logic high level to indicate that the only type of information that can be written during a bus cycle is stored data and not the operating code of the system. Next, the address signals A31-2 on the lines 32 are sent from the CPU 12. As soon as the addresses signals A31-2 on the lines 32 and bus definition signals 26–30 are valid within the first clock cycle, as indicated in FIG. 4, the CPU 12 initiates the ADS* signal on the line 34 at an active level to indicate the beginning of a CPU driven bus cycle, also during the first clock cycle. The CADS* signal on the line 36 is generated by the cache control logic 10 of the present invention such that once the ADS* signal on the line 34 is detected at an active level, the CADS* signal on the line 36 is set at inactive level until the end of the write cycle is detected.

The CPU indicates that it is beginning a single double word write cycle by driving the BLAST* signal on the line 38 inactive during the second clock cycle. The bus arbitrating logic 16 responds to the CPU 12 by driving the BRDY* signal on the line 40 active indicating it is ready to perform a write cycle. A central processor 12, such as an Intel 486DX processor, is capable of writing a maximum of 32 bits during a write cycle. Thus, if two 32-bit words are to be written it will require two write cycles as indicated in FIG. 4. If the address requested by the CPU 12 is available in the cache storage area 22, the MATCH signals on the lines 42 are set to an active level to indicate that the requested address is located in the synchronous SRAMs 24 of the cache 22. At this point, the data D31-2 to be written to the cache 22 are valid on the data lines 48. The CDWE* signals on the lines 47 are set to an active level to enable the data D31-2 to be written into the cache 22. The CDOE* signal on the line 45 remains at an inactive level for the entire cycle, since the cycle is not a read cycle and data are not output from the synchronous SRAMS 24. The BLAST* signal on the line 38 remains at an active level for the entire write cycle. The end of the write cycle is determined by the alternate cache control logic 10 of the present invention by the receipt of the BUSY* signal on the line 50 at an active level, the BRDY* signal on the line 40 at active level and the BLAST* signal at an active level. The BUSY* signal on the line 50 is provided by the bus arbitrating logic 16 which indicates that a bus cycle is in progress. As described above, when the BUSY* signal on the line 50 is active, other processors are prevented from trying to take control of the system bus 20 when the bus 20 is currently in use. As illustrated in FIG. 4, the end of the cycle is determined by the receipt of an active BLAST* signal on the line 38 and an active BRDY* signal on the line 40. The BRDY* signal on the line 40 indicates that the cache storage area 24 has received the valid data on the system bus 20 and has written the data into the memory. Upon the detection of the end of the cycle along with the receipt of the BUSY* signal on the line 50, the alternate control signal (CADS*) on the line 36 is set to an active level, i.e. a low logic level, to cause the synchronous SRAMs to repeatedly sample the address lines until the beginning of the next access to the cache memory storage area 22.

Since the write cycle can only accommodate 32 bits, in order to accommodate writing a 64-bit word or two 32-bit operands, two write cycles must be performed. As illustrated in FIG. 4, a second write cycle is performed immediately after the first cycle in order to accommodate the larger word sizes. The CPU 12 presents new address signals A31-2 on the lines 32, bus definition signals on the lines 26–30 and regenerates an ADS* signal on the line 34 to begin the new cycle. The second cycle progresses identically to the first cycle as described above and completes the second write cycle.

Figure 5:
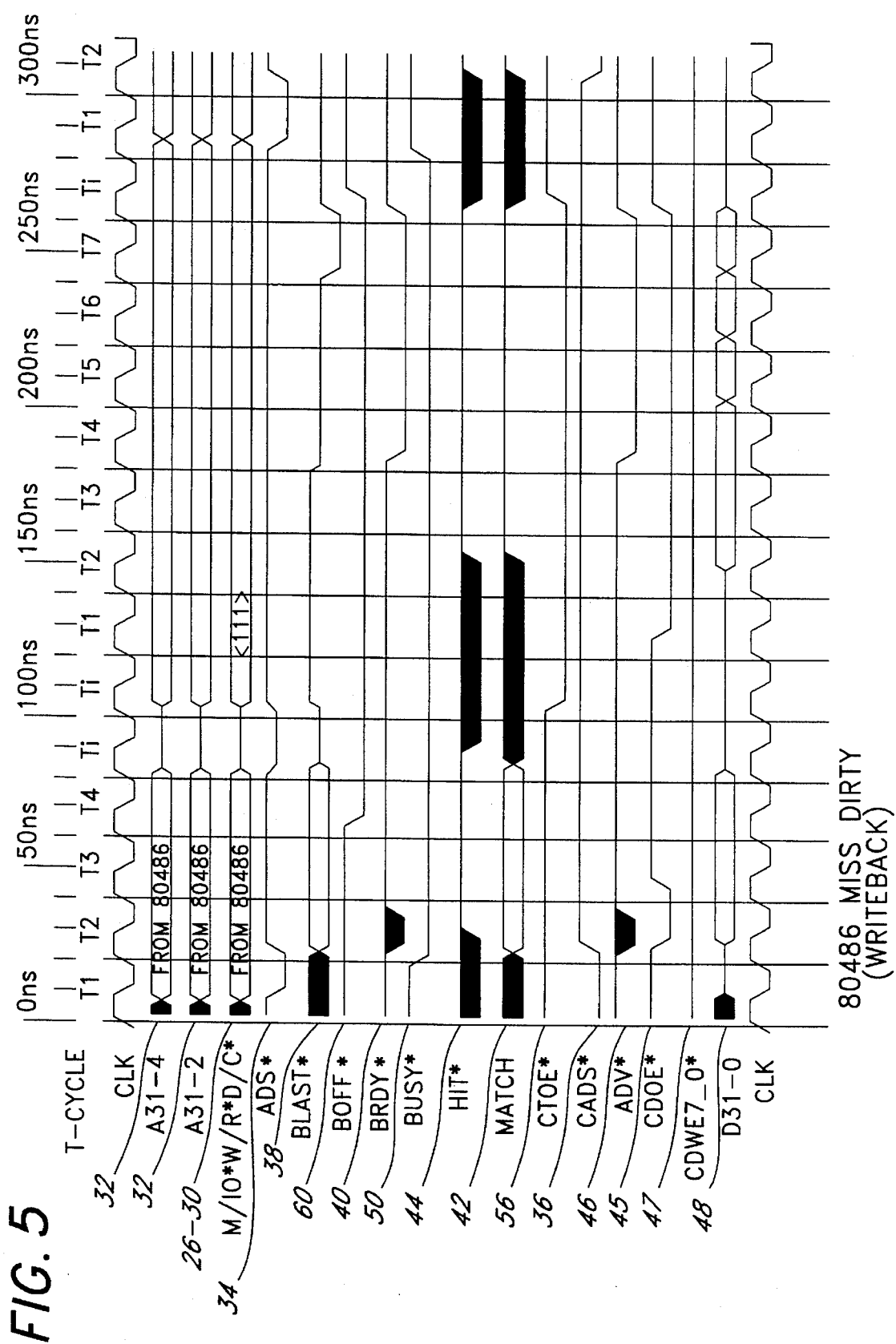
FIG. 5 is a timing diagram illustrating the timing of the bus control signals during a CPU cache miss dirty read cycle with a write back cycle for a system which utilizes the alternate cache control logic of the present invention.

FIG. 5 illustrates a CPU read miss dirty cycle with the write back function included in the cycle. The CLK signal illustrates the progression of the miss dirty cycle. The bus definition signals which preferably include the W/R* signal on the line 26, the M/IO* signal on the line 28 and the D/C* signal on the line 30 are initiated during the first clock cycle to define the type of bus request. The requested address signals A31-4, A3-2 are presented on the lines 32 by the CPU 12 during the first clock cycle. The CPU 12 initiates the ADS* signal on the line 34 at an active level during the first clock cycle to indicate the beginning of a CPU driven bus cycle. Simultaneously, the CPU generates the address signals A31-4, A3-2 and the bus definition signals and presents them to the system bus 20. The CADS* signal on the line 36 is generated by the cache control logic 10 of the present invention such that once the CPU 12 begins a bus cycle, i.e., the ADS* signal on the line 34 is detected at an active level, the CADS* signal on the line 36 is set at an inactive level until the end of the bus cycle is detected. The CPU 12 indicates that it is beginning a burst cycle by driving the BLAST* signal on the line 38 inactive during the second clock cycle. The cache storage area 22 will check to see if the address which is requested is a valid cache address. As the address signals A31-4, A3-2 on the lines 32 requested by the CPU 12 are not available in the cache storage area 22, the MATCH signals on the line 42 are returned at an inactive level. The MATCH signals on the lines 42 are delivered to the bus arbitrator circuitry 16 which sets the HIT, signal on the line 44 to an inactive level to indicate that the requested data are not located in the cache storage area 22. A CTOE* signal on the line 56 is set to an inactive level for the first portion of the cycle to disable a set of TAG RAMS 58 which act as an address decoder for the cache storage area 22. Since the cache storage area 22 does not contain the requested data, the bus arbitrator circuitry 16 returns an inactive BRDY* signal on the line 40 to indicate that the requested data are not available from the cache storage area 22. Since the data were not available in the cache storage area 22, the ADV* signal on the line 46 and the CDOE* signals remain at an inactive level. Since the cache storage area 22 was unable to locate the requested address signals A31-2 on the lines 32, the cache control logic checks the status of the cache storage area 22. In this case, the cache storage area contains "dirty" data which must first be copied back into their locations in the main memory 18 before the cache cycle can proceed.

The CPU 12 is forced off the bus 20 at the beginning of the copy back cycle by the initiation of a BOFF* signal on the line 60. The BOFF* signal on the line 60 is generated by the bus arbitrating circuitry 16 and informs the CPU 12 that it must immediately relinquish the bus 20 even if the CPU 12 is in the middle of a cycle. The CADS* signal on the line 36 remains inactive for the entire cycle to hold in an index portion the address signals A31-2 of the requested data in the synchronous SRAM chips 24 of the cache 22, so that once the data are copied back into the main memory 18 the read cycle may continue where it left off. The CTOE, signal on the line 56 is set to an active level during the second portion of the cycle to enable the tag RAMS 58 to drive the tag portion of the address signals A31-4, A3-2 of the "dirty" data which are to be copied back into the main memory 18. The CDOE* signal on the line 45 is set to an active level to enable the dirty data to be output on to the system bus 20. The ADV* signal on the line 46 is set to an active level to advance the address to each subsequent address to write the entire line of dirty data back into the main memory in a burst mode. The BLAST* signal on the line 38 is driven to an active level, it indicates to the cache control logic 10 and bus arbitrating logic 16 that the receipt of the next BRDY* signal on the line 40 will indicate the end of the bus cycle. As discussed above, the end of a burst cycle is determined by the cache control logic 10 of the present invention by the receipt of the BRDY* signal on the line 40 and the BLAST* signal on the line 38. Upon the detection of the end of the cycle along with the receipt of the BUSY* signal on the line 50, the alternate cache control signal (CADS*) on the line 36 is set to an active level, i.e., a low logic level, to cause the synchronous SRAMs to continually sample the address lines until the CPU 12 initiates a new bus cycle. In addition, at the end of the cycle when the "dirty" data have been written back into the main memory 18, the BOFF* signal on the line 60 is driven to an inactive level to enable the CPU 12 to return to using the system bus 20 to complete the remainder of the read miss cycle. The CPU 12 will reinitiate the read cycle after the bus is returned. The CPU will issue an ADS* signal and will resend the address signals A31-2 on the lines 36 to the system bus 20. The read cycle will be a "clean" cache miss cycle and the bus arbitrator logic 16 will look to the main memory to locate the requested address. Once the valid data D31-0 on the lines 48 are located in the main memory, the data are simultaneously read into the CPU 12 and is written into the cache storage area 22.

Figure 6:
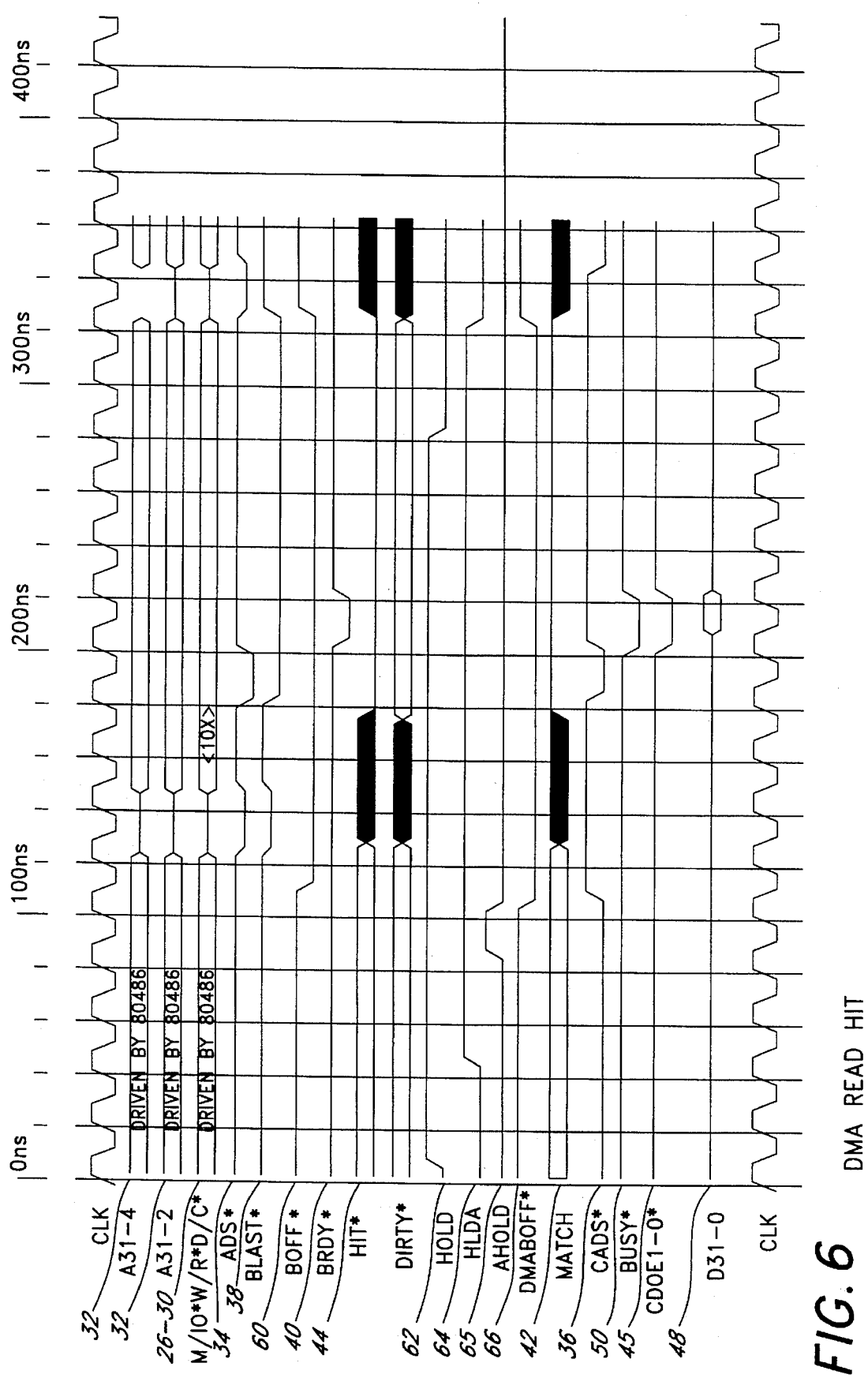
FIG. 6 is a timing diagram illustrating the timing of the bus control signals during a DMA read cache hit cycle for a system which utilizes the alternate cache control logic of the present invention.

FIG. 6 illustrates a DMA read hit cycle. When a DMA cycle is initiated by the DMA controller 14, the DMA controller 14 sends a HOLD signal on the line 62 to the CPU 12 or to the bus arbitrating circuitry 16, in the system of the present invention the bus arbitrating circuitry 16 is preferred. The CPU 12 or bus arbitrating circuitry 16 responds with a HLDA signal on the line 64 to indicate that it will relinquish the bus 20 to the DMA controller 14. One clock signal before the bus arbitrating circuit 16 generates a BOFF* signal on the line 60 which forces the CPU 12 to immediately terminate its current cycle, the bus arbitrating circuit sends an AHOLD signal on the line 65 to the CPU 12. The AHOLD signal on the line 65 only forces the CPU to relinquish control of the address signals A31-2 on the line while the remainder of the bus 20 remains active. The purpose of the AHOLD signal on the line 65 is to warn the CPU 12 that the bus 20 is about to be relinquished to the DMA controller 14, so the CPU 12 can gracefully terminate its present cycle. After sending the AHOLD signal on the line 65, the cache control logic sends the DMABOFF* signal on the line 66 to the bus arbitrator 16 to request that the CPU 12 relinquish the bus 20 as soon as possible. Within the same clock cycle, the bus arbitrator logic 16, sets the BOFF* signal on the line 60 to an active level. The CPU 12 will relinquish the bus 20 immediately and float its W/R*, D/C*, M/IO*, D31-2, A31-2, ADS*, BLAST* and its other bus control pins, before the next clock cycle. Since the ADS* signal on the line 34 is now floated, the DMA controller 14 must indicate to the cache storage area 24 and the main memory 18 that it is ready to start a bus cycle.

Once the bus 20 is under the control of the DMA controller 14, at the beginning of a DMA cycle, the GSTART* signal on the line 68 is driven active and the S_REFGRNT, signal, or refresh generating signal, on the line 70 is driven inactive. When the cache control logic 10 of the present invention detects the beginning of a DMA cycle, the address signals A31-4, A31-2 are valid on the lines 32 and the bus definition signals M/IO*, W/R* and D/C* are valid on the lines 26, 28, 30, respectively. At this point, the CADS* signal on the line 36 becomes active for one clock cycle which enables the burst synchronous SRAMs 24 to sample the valid address signals A31-3, A31-2 on the lines 32 into the synchronous SRAMs 24 during the portion of the DMA cycle when the address lines are known to be stable and valid to prevent corruption of the data in the synchronous SRAMs. After the address signals A31-4, A31-2 are sampled into the burst synchronous SRAMs 24, the CADS* signal on the line 36 is driven inactive for the remainder of the cycle to prevent the initial address from being continuously sampled into the synchronous SRAMs 24. It is important that other address signals A31-4, A31-2 are not sampled into the synchronous SRAMs 24 in violation of the set up and hold times of the synchronous SRAMs to prevent possible corruption of the stored data. The MATCH signals on the line 42 are at an active level which indicates that the cache storage area 22 contains the address of the requested data. The MATCH signals on the lines 42 are returned to the bus arbitrating circuitry 16. The bus arbitrating circuitry 16 initiates the HIT, signal on the line 44 to an active level to indicate that a cache HIT has occurred. The BLAST* signal on the line 38 is set to an active level to indicate that the receipt of the next BRDY* active signal on the line 40 will indicate the end of the cycle. In the next clock cycle, the CDOE* signals on the line 45 are set to an active level to enable the valid data which are stored in the synchronous SRAMs 24 to be output onto the system bus 20. In the same clock cycle, the BRDY* signal on the line 40 is returned at an active level from the cache storage area 24 to indicate that valid data are being returned. The data signals D31-0 on the line 48 are valid and are read into the DMA controller 14. After the data have been read by the DMA controller 14 and the DMA cycle is complete, the DMA controller resets the HOLD signal on the line 62 to an inactive level. The bus arbitrator 26 resets the HLDA signal on the line 64 to an inactive level in response to the receipt of the reset HOLD signal on the line 62. The DMABOFF* signal on the line 66 is set to the inactive or idle level, and the bus arbitrating logic 16 sets the BOFF* signal to the CPU 12 to an inactive level to return the use of the bus 20 to the CPU. At the end of the DMA cycle, the CADS* signal on the line 36 is returned to an active level to enable the synchronous SRAMs to sample the addresses from any of the processors which initiate a new bus cycle.

Figure 7:
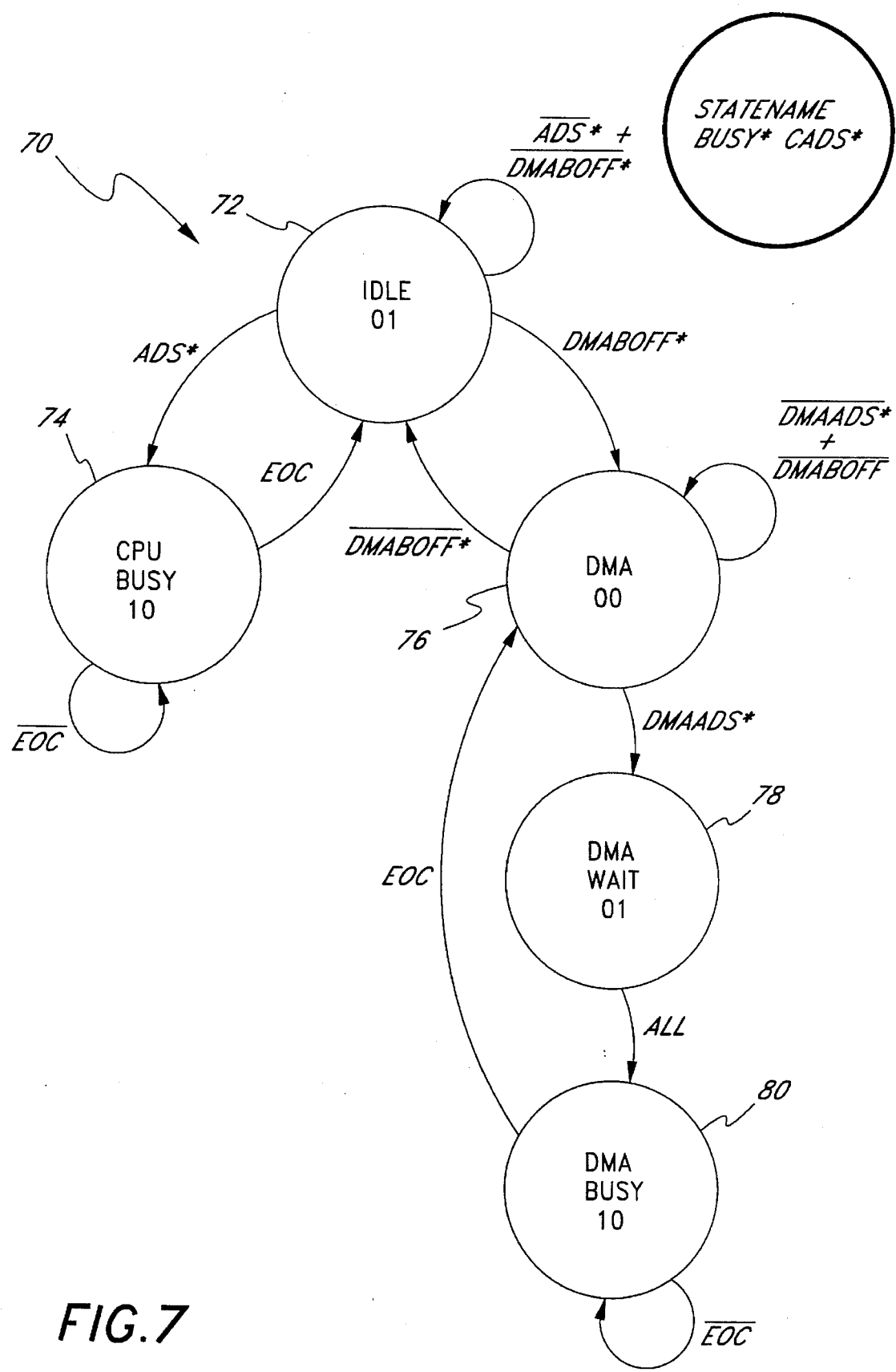
FIG. 7 is a state diagram of a preferred embodiment of the cache control logic of the present invention formed in a Programmable Logic Array.

FIG. 7 illustrates a state diagram 70 of a preferred embodiment of the cache control logic 10 of the present invention which is preferably implemented in an Application Specific Integrated Circuit (ASIC). Each state is indicated by a circle which contains the name of the state as well as the condition of the cache control signals, BUSY* and CADS*. The BUSY* signal is an input to the cache control logic 10 of the state diagram 70 and the CADS* signal is an output of the cache control logic 10. Although only two state variables are shown to simplify the description of the state diagram, other state variables are used to distinguish between the different states. For illustrative purposes, a 0 in the signal location indicates that the signal is inactive and a 1 indicates that the signal is active. The state diagram 70 begins in the idle state 72 where the BUSY* signal is in an inactive state and the CADS* signal is in an active state. In the idle state, the cache control logic 10 awaits the receipt of an active ADS* signal to indicate that the CPU 12 is ready to begin a bus request or a DMABOFF* signal which indicates that the DMA is ready to begin a bus request. Upon the receipt of an active ADS* signal, the system moves into the CPU busy state 74. In the CPU busy state 74, the BUSY* signal is at an active level and the CADS* signal is at an inactive level. The control logic 10 remains in the CPU BUSY state 74 until it detects the end of the cycle, or EOC. Upon detection of the EOC, the CPU 12 will return to the idle state 72 and await the receipt of another ADS* active signal or an active DMABOFF* signal. Once in the idle state 72, when the cache control logic 10 receives an active DMABOFF* signal, the cache control logic 10 moves into the DMA state 76. In the DMA state 76, both the BUSY* signal and the CADS* signal are at an inactive level. If the cache control logic does not receive another active DMABOFF* signal and it does not receive an ADS* signal from the DMA controller 10 (for illustrative purposes it is referred to as a DMA ADS in the state diagram 70), then the cache control logic will remain in the DMA state 76. If the cache control logic 10, receives a DMA ADS signal, the cache control logic proceeds to the DMA WAIT state 78. In the DMA WAIT state 78, the BUSY* signal remains at an inactive level and the CADS* signal is set to an active level. The cache control logic 10 only stays in the DMA WAIT state 78 for one clock cycle and then immediately proceeds to the DMA BUSY state 80 for all cases. The DMA WAIT state 78 is only used to set the CADS* signal to an active level for one clock period to enable the DMA address request to be sampled into the synchronous SRAMs 24 during the only cycle when the address signals are known to be in a stable and valid state. In the DMA BUSY state 80, the BUSY signal is set to an active level and the CADS* signal is reset to an inactive level. The cache control logic 10 will remain in the DMA BUSY state 80 until the end of the cycle, or EOC, is detected and the cache control logic 10 will return to the DMA state 76. Once in the DMA state 70, the BUSY* signal is returned to an inactive level. From the DMA state 70, the cache control logic awaits another DMA ADS signal which in this case indicates a back to back DMA request of the bus. However, in most cases the bus arbitrator logic 16 will set the DMABOFF* signal to an inactive level which will indicate that the DMA controller 14 has relinquished control of the bus 20, and the cache control logic 10 will return to the idle state 72.

The alternate cache control logic 10 of the present invention has many improved features over prior art cache control systems besides those described above. By generating the alternate control signal (CADS*) on the line 36, a majority of the signal inputs that load the ADS* signal on the line 34 are removed, because all of the synchronous SRAM control responsibilities of the ADS* signal have been assumed by the CADS* signal. The ADS* signal on the line 36 is only connected to a single input of the cache control logic 10 of the present invention as well to as the bus arbitrating circuitry 14, to an address latch controller (not shown), and to a parity checking circuit (not shown). By removing more than half of the chips to which the ADS* signal must be connected, the loading of the ADS* signal is greatly reduced. In addition, more than half of the distance that the ADS* signal must travel is removed, thus reducing the capacitive loading caused by the length of the traces that the ADS* signal must traverse in a given clock cycle. By reducing the capacitive loading of the ADS* signal, the ADS* signal will be delivered to all of the control circuits listed above within the required set up and hold times of each circuit to enable the control circuits to function properly.

In addition, the cache control logic 10 which generates the CADS* signal includes a high current output driver which provides a CADS* signal on the line 36 which is not easily loaded down. Preferably, the high current output driver will quickly switch the CADS* signal from an active signal to an inactive signal and visa versa even when the signal is loaded by all of the synchronous SRAM chips and by the trace length that the signal must traverse each clock cycle.

Another feature enables an increase in the capacity of the cache storage area 22 of the computer system 8. The cache control logic 10 of the prior art system required that each synchronous SRAM chip 24 receive the ADS* signal on the line 34. As the number of synchronous SRAM chips 24 increases, the time delay caused by the loading of the ADS* signal on the line 34 increases as well. By providing an alternate control signal CADS* on the line 36 to connect to each synchronous SRAM chip 24, the ADS* signal loading problems have greatly decreased. The CADS* signal on the line 36 can preferably be connected to at least eight different synchronous SRAM chips 24 without suffering more than a 2–3 ns delay in the receipt of the signal by all of the synchronous SRAM chips 24. More preferably, up to a sixteen synchronous SRAM chips 24 may be utilized in the cache storage area 22 each of which are connected to the CADS* signal on the line 36 without causing more than a 2–3 ns delay in the receipt of the CADS* signal on the line 36 by all of the synchronous SRAM chips 24 in the cache storage area 22. Furthermore, because the CADS* signal is generated continuously between bus cycles, it is effectively generated much earlier than the ADS* signal is generated by the CPU or other accessing device. Therefore, by using the 32K×9 burst static synchronous SRAMS 24 which are currently available, the cache storage area 22 can store anywhere from 256 Kb to 512 Kb of data in the cache 22. As the static synchronous SRAM technology continues to improve and the amount of data that can be stored on a single synchronous SRAM chip 24 increases, the memory storage capacity of the cache storage area 22 can continue to grow without causing the number of synchronous SRAM chips 24 to increase beyond the preferable sixteen synchronous SRAM chip cache storage area 22 disclosed above.

Further, multiple CADS* signals may be generated by duplicating the portion of the cache control logic 10 which generates the CADS* signal to enable additional synchronous SRAMS to further expand the storage capabilities of the cache storage area 22. Lastly, if an ASIC circuit is used, the same logic output may be buffered and sent to multiple output pins.

Another feature enables an increase in the system performance time for memory retrieval from the cache storage area 22. By providing a computer system 8 with an increased cache storage area 22, the probability of the requested address A31-2 being stored in the cache storage area 22 will greatly increase. By increasing the probability of a cache HIT, the performance time for a memory access cycle will be greatly increased, as the desired data are more often located in the cache storage area 22 and the system does not have to go all the way to the main memory 18 or to an external I/O device (not shown) to locate the requested data.

The present invention may be embodied in other specific forms without departing from its spirit or essential characteristics. The described embodiments are to be considered in all respects only as illustrative and not restrictive. The scope of the invention is, therefore, indicated by the appended claims rather than the foregoing description. All changes which come within the meaning and range of equivalency of the claims are to be embraced within their scope.

What is claimed is:

1. An improved cache control logic system for a computer system, said computer system including a central processor which generates a plurality of address signals and activates an address valid signal when it begins a memory access cycle, said computer system further including a cache storage area and a system bus, said system bus interconnecting the central processor and the cache storage area, said cache storage area receiving said address signals and latching said address signals to begin an access cycle when said address valid signal is active, said cache control logic system comprising:

cache control signal generation logic which generates an alternate cache control signal which is provided as a control input to said cache storage area instead of said address valid signal, said alternate cache control logic signal being set at an active level before the central processor activates the address valid signal to enable the cache storage area to receive said plurality of address signals from said system bus, and said alternate cache control signal being set at an inactive level to latch said address signals in said cache storage area to cause said cache storage area to hold said latched address signals present when said alternate cache control signal changes from said active level to said inactive level so that said latched address signals remain unchanged within said cache storage area while said alternate cache control signal is at said inactive level, said cache control signal generation logic receiving said address valid signal from said central processor when said central processor is ready to begin a memory access cycle on said bus and setting said alternate cache control signal at said inactive level after the beginning of said memory access cycle, said cache control signal generation logic determining when said memory access cycle has ended and setting said alternate cache control signal at said active level to enable said cache storage area to receive address signals on said system bus.

2. The improved cache control logic as defined in claim 1 further comprising:

a direct memory access (DMA) controller which is connected to the system bus; and DMA interface logic that determines that said DMA controller is ready to begin a memory access cycle and that sets said alternate cache control signal at said active level for at least one clock cycle at the beginning of said memory access cycle when the direct memory access controller presents valid address signals to the system bus.

3. Improved cache control logic for a computer system, said computer system having at least a central processor, a cache storage area and a system bus interconnecting the central processor and the cache storage area, the central processor selectively initiating a memory access by activating an address status output signal, said cache control logic comprising:

a plurality of state defining elements having outputs having logic levels, said outputs defining states of said cache control logic, said state defining elements providing said outputs at a first set of logic levels to define an idle state wherein an alternate cache control signal is maintained at an active level before activation of said address status output signal to enable address signals from said central processor to be sampled into said cache storage area, and said state defining elements providing said outputs at a second set of logic levels to define a CPU BUSY state which occurs when said cache control logic is in said idle state and said active address status output signal is received by said cache control logic, said alternate cache control signal being maintained at an inactive level during said CPU busy state until the end of a bus cycle is detected, at which time said cache control logic returns to the idle state and said alternate cache control signal is activated, wherein said alternate cache control signal is generated by said control logic and is supplied to said cache storage area in replacement of said address status output signal.

4. The improved cache control logic for a computer system as defined in claim 3, wherein the computer system further comprises a direct memory access (DMA) controller which is connected to the system bus, wherein said state defining elements provide said outputs at a third set of logic levels to define a DMA state which occurs when said cache control logic is in said idle state and said DMA controller receives control of the system bus, wherein said alternate cache control signal is set to said inactive state and wherein said cache control logic returns to said idle state when the DMA controller relinquishes control of the system bus, said state defining elements providing said outputs at a fourth set of logic levels to define a DMA WAIT state which occurs when said cache control logic is in said DMA state and the DMA controller sets a DMA address status output signal to an active level, wherein said alternate cache control signal is set to said active level for at least one clock cycle, and said state defining elements providing said outputs at a fifth set of logic levels to define a DMA BUSY state which occurs at least one clock cycle after a DMA wait state, wherein said alternate cache control signal is reset to said inactive level and upon detection of the end of a bus cycle said cache control logic will return to the DMA state.

5. An improved cache control system for a computer system, said computer system including a central processor and a cache storage area, said computer system further including a system bus interconnecting the central processor and the cache storage area, the central processor activating an address status signal when the computer system is ready to begin a memory access, said cache control system comprising:

first state logic which provides an alternate cache control signal to said cache storage area instead of said address status signal, said state logic maintaining said alternate cache control signal at an active level prior to the central processing unit activating said address status signal to enable the cache storage area to receive address signals on said system bus from said central processing unit until said central processing unit activates said address status signal;

second state logic which senses when the central processing unit has activated said address status signal and which thereby determines that the central processor is beginning a bus cycle, said second state logic setting said alternate cache control signal to an inactive level after the central processor has activated said address status signal to cause said cache storage area to latch said address signals received via the system bus at the beginning of the bus cycle so that said latched address signals remain unchanged within said cache storage area while said alternate cache control signal is at said inactive level; and third state logic which senses when the bus cycle has ended and which resets said alternate cache control signal to said active level upon detection of the end of the bus cycle and which resets and maintains said alternate cache control signal in said active level until a next memory access cycle is initiated.

6. An improved cache control system for a computer system, said computer system including a central processor and a cache storage area, said computer system further including a system bus interconnecting the central processor and the cache storage area, the computer system further including a direct memory access (DMA) controller which is connected to the system bus and which can initiate a bus cycle by activating a DMA valid address signal, the improved cache control system comprising:

first state logic which senses when the DMA controller is ready to begin a bus cycle and which sets an alternate cache control signal to an active level far at least one clock cycle to enable the cache storage area to sample address signals from the DMA controller which have been placed on the system bus; and second state logic which sets said alternate cache control signal to an inactive level after the address signals have been sampled into the cache storage area to cause said address signals to be held unchanged by said cache storage area until said alternate cache control signal again becomes active, wherein said alternate cache control signal is supplied to said cache storage area in replacement of said DMA valid, address signal.

7. A method of improving cache accesses in a computer system, wherein the computer system comprises a central processor, a direct memory access (DMA) controller, a cache control system, and a cache storage area which share a system bus, said method comprising the steps of:

maintaining an alternate cache control signal at an active level to enable transfer of a series of address signals to said cache storage area before said central processor activates an address valid signal to initiate a bus cycle on said system bus;

determining that said central processor is ready to begin a central processor driven bus cycle on said system bus when said address valid signal is activated by said central processor;

setting said alternate cache control signal at an inactive level after said central processor activates said address valid signal to thereby stop said cache storage area from responding to changes in said address signals from the system bus after a beginning of said central processor driven bus cycle so that a last one of said series of address signals is maintained constant within said cache storage area;

determining when said central processor driven bus cycle is complete, and resetting said alternate cache control signal to said active level after said central processor driven bus cycle is complete to enable the cache storage area to receive further address signals from the system bus;

determining that said DMA controller is ready to begin a DMA controller driven bus cycle on said system bus by activating a DMA address valid signal;

setting mid alternate cache control signal at said active level for at least one clock cycle to enable transfer of a DMA address signal from the system bus to said cache storage area at the beginning of said DMA controller driven bus cycle;

setting said alternate cache control signal at said inactive level to stop said cache storage from responding to changes in said address signals from the system bus during said DMA controller driven bus cycle, so that said DMA address signal is maintained constant within said cache storage area;

determining when said DMA controller driven bus cycle is complete; and resetting said alternate cache control signal to said active level to enable the cache storage area to receive further address signals from the system bus, wherein said alternate cache control signal is generated by said cache control system and is supplied to said cache storage area in replacement of said central processor address valid or said DMA address valid signal.

* * * * *

UNITED STATES PATENT AND TRADEMARK OFFICE
CERTIFICATE OF CORRECTION

PATENT NO. : 5,499,353
DATED : March 12, 1996
INVENTOR(S) : Kenneth A. Kadlec and Wendy P. Kadlec It is certified that error appears in the above-indentified patent and that said Letters Patent is hereby corrected as shown below:

In column 17, at line 1, change "mid" to --said--

In column 18, at line 9, change "address valid or" to --address valid signal or--

Signed and Sealed this

Fourth Day of November, 1997

*Attest:*

BRUCE LEHMAN

*Attesting Officer*     *Commissioner of Patents and Trademarks*